(12) United States Patent
Chen

(10) Patent No.: US 6,254,327 B1
(45) Date of Patent: Jul. 3, 2001

(54) SCREW WITH SPIRAL TRIANGULAR THREADS

(75) Inventor: Chun-Chin Chen, Taipei (TW)

(73) Assignee: Chun Chen Screw Co., Ltd., Taipei Hsian (TW)

( * ) Notice: Subject to any disclaimer, the term of this patent is extended or adjusted under 35 U.S.C. 154(b) by 0 days.

(21) Appl. No.: 09/451,712

(22) Filed: Dec. 1, 1999

(51) Int. Cl.⁷ ..................................................... F16B 35/04
(52) U.S. Cl. ...................... 411/411; 411/387.4; 411/310
(58) Field of Search .................. 411/387.4, 386, 411/308, 310, 311, 416, 411, 412, 417, 418

(56) References Cited

U.S. PATENT DOCUMENTS

| | | | |
|---|---|---|---|
| 3,918,345 | * 11/1975 | Phipard | 411/416 |
| 4,637,767 | * 1/1987 | Yaotani | 411/411 |
| 5,044,855 | * 9/1991 | Fukibayashi | 411/416 |
| 5,772,374 | * 6/1998 | Ode | 411/386 |

FOREIGN PATENT DOCUMENTS

| | | | |
|---|---|---|---|
| 957675 | * 5/1964 | (GB) | 411/416 |
| 2040769 | * 9/1980 | (GB) | 411/416 |

* cited by examiner

*Primary Examiner*—Flemming Saether
(74) *Attorney, Agent, or Firm*—A & J

(57) ABSTRACT

A screw comprising a shank having an upper portion formed with spiral circular threads and a lower portion formed with spiral triangular threads, each of said spiral triangular threads having three sharp edges and three pointed tips, said pointed tips of said spiral triangular threads being located at different positions, whereby the screw can be easily and rapidly turned into a piece of hard wood.

1 Claim, 3 Drawing Sheets

SCREW WITH SPIRAL TRIANGULAR THREADS

BACKGROUND OF THE INVENTION

1. Field of the Invention

This invention is related to an improvement in the structure of a screw and in particular to one which can be easily turned into a piece hard wood.

2. Description of the Prior Art

The conventional screw consists essentially of a solid cylinder, usually of metal, around which a thread winds spirally, either clockwise or counterclockwise. However, it is difficult to turn the screw into an object if it is made of hard wood. Hence, an improved screw (see FIG. 1) has been designed to obviate this drawback. As shown, the screw includes a shank 1 formed with spiral circular threads 11 at the upper portion thereof. The spiral circular threads 11 at the lower portion of the shank 1 are provided with a plurality of teeth 12 for facilitating the tuning of the screw into the wood. Nevertheless, although the teeth 12 enables the screw to turn into a piece of hard wood, it still requires a lot of effort to turn the screw thereby often making one feel utterly exhausted in order to fasten pieces of hard wood.

Therefore, it is an object of the present invention to provide an improvement in the structure of a screw which can obviate and mitigate the above-mentioned drawbacks.

SUMMARY OF THE INVENTION

This invention is related to an improvement in the structure of a screw.

According to a preferred embodiment of the present invention, a screw comprising a shank having an upper portion formed with spiral circular threads and a lower portion formed with spiral triangular threads, each of said spiral triangular threads having three sharp edges and three pointed tips, said pointed tips of said spiral triangular threads being located at different positions.

It is the primary object of the present invention to provide an improved screw which can be easily turned into a piece of hard wood.

It is another object of the present invention to provide an improved screw which is simple in construction.

It is a further object of the present invention to provide an improved screw which is inexpensive to manufacture.

The foregoing objects and summary provide only a brief introduction to the present invention. To filly appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
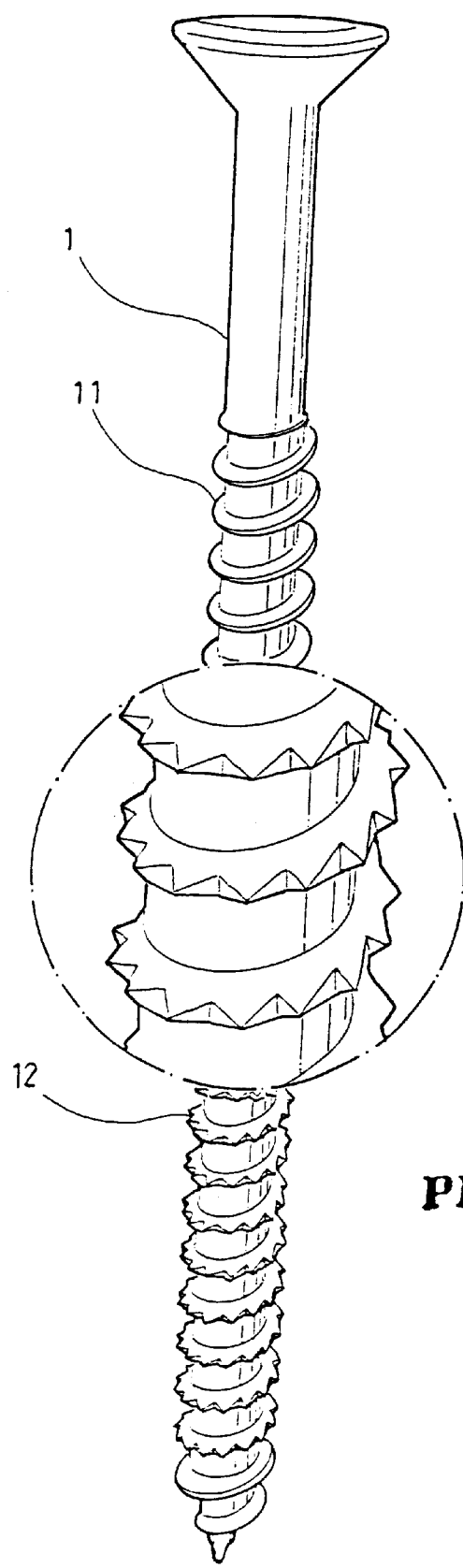
FIG. 1 is a perspective view of a prior art screw.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
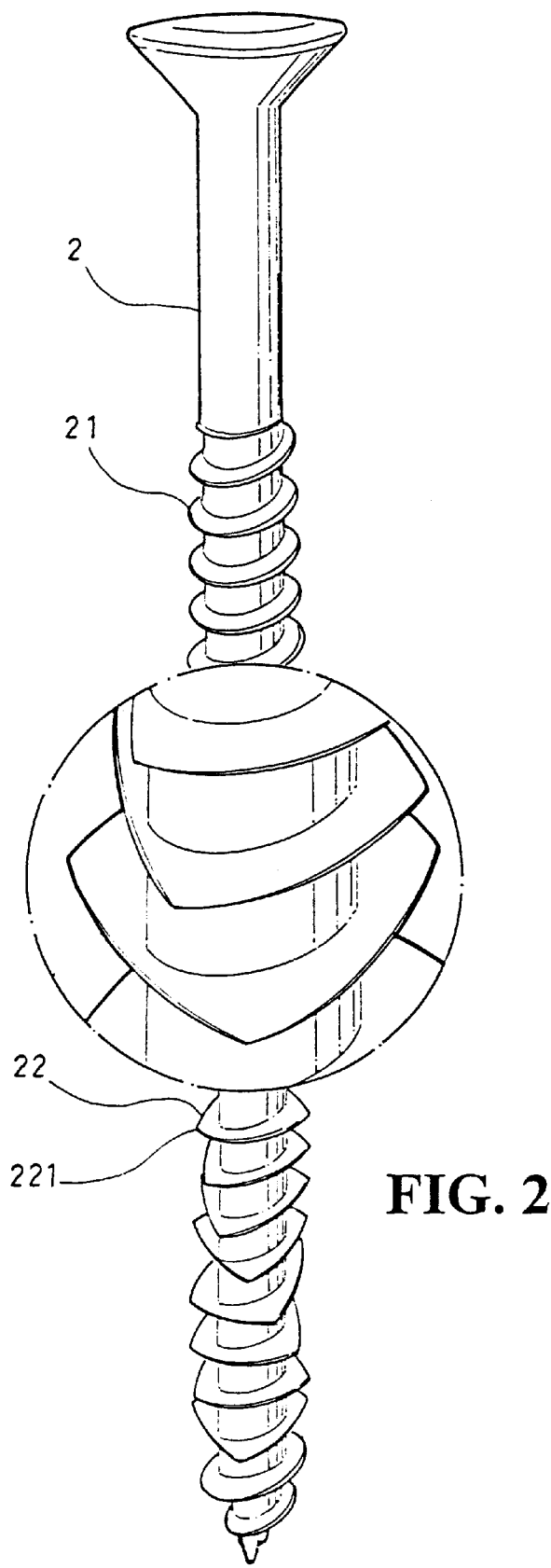
FIG. 2 is a perspective view of the present invention.

With reference to the drawings and in particular to FIG. 2 thereof, the screw 2 according to the present invention comprises a shank (shown but not numbered) formed with spiral circular threads 21 at the upper portion and spiral triangular threads 22 at the lower portion. Each of the spiral triangular threads 22 has three sharp edges and three pointed tips 221. The spiral triangular threads 22 are arranged so that the pointed tips 221 of each of the spiral triangular threads 22 are located at different positions. However, the pointed tips 221 of the spiral triangular threads 22 may be arranged in alignment as required. As the screw 2 is turned into a piece of wood, the pointed tips 221 of the triangular threads 22 of the screw 2 will cut the wood before the circular threads 21 are turned into the wood thereby making it easier for the screw 2 to turn into the wood.

Figure 3:
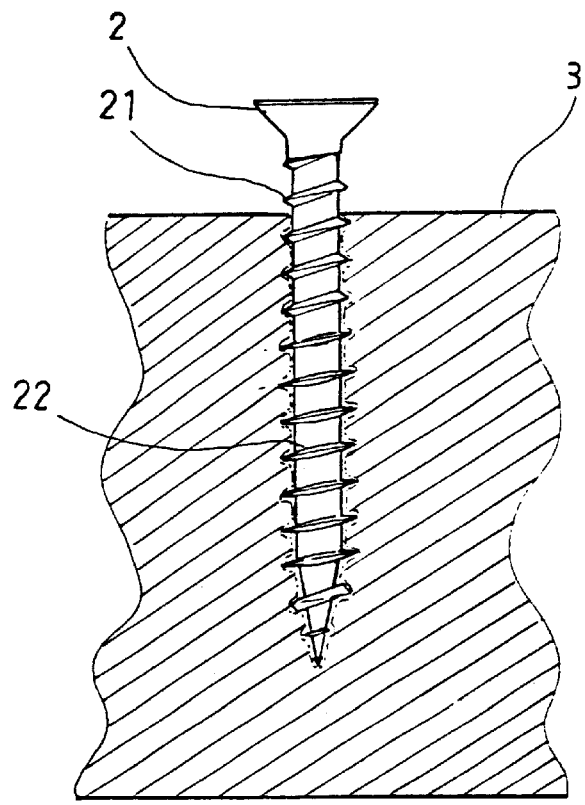
FIGS. 3 and 4 illustrate the working principle of the present invention.

Referring to FIG. 3, the pointed tips 221 of the triangular threads will cut the wood 3 when turned into the wood thereby facilitating the screw 2 to turn into the wood 3. Further, a spiral passage will be formed as soon as the pointed tips 221 of the triangular threads 22 are turned into the wood 3 so that the circular threads 21 can be easily turned into the wood 3 along the spiral passage.

Figure 4:
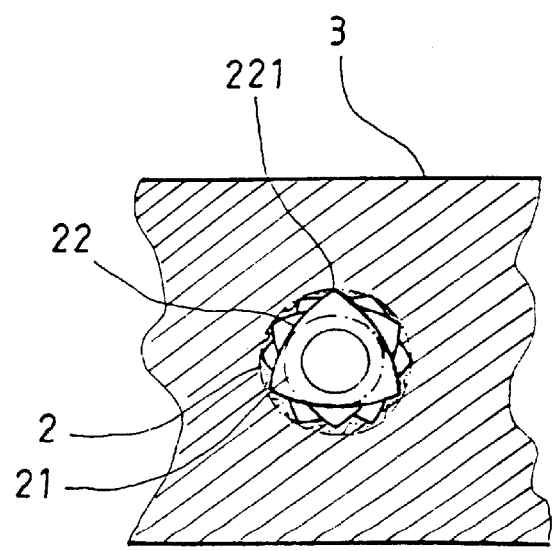

Looking now at FIG. 4, when the screw 2 is turned into the wood 3, the pointed tips 221 of the triangular threads 22 will cut the wood 3 but the three sides of the triangular threads 22 will not be in contact with the wood 3 thus reducing the friction between the screw 2 and the wood 3.

It will be understood that the threads 22 may be of other shapes such as pentagon, hexagon, or the like and each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A screw comprising a cylindrical shank having an upper portion formed with spiral circular threads and a lower portion formed with spiral triangular threads, each of said spiral triangular threads having three sharp edges and three pointed tips, the pointed tips of axially adjacent spiral triangular threads being located at circumferentially different positions, said cylindrical shank having a pointed end at a lower portion thereof.

* * * * *